US010348156B2

(12) United States Patent
Stewart et al.

(10) Patent No.: US 10,348,156 B2
(45) Date of Patent: Jul. 9, 2019

(54) ACTUATOR WITH SEAL BAND (71) Applicant: CTS Corporation, Lisle, IL (US)

(72) Inventors: William Shelby Stewart, Elkhart, IN (US); Eric David Andrina, Niles, MI (US); Lei Zhao, West Lafayette, IN (US)

(73) Assignee: CTS Corporation, Lisle, IL (US)

( * ) Notice: Subject to any disclaimer, the term of this patent is extended or adjusted under 35 U.S.C. 154(b) by 234 days.

(21) Appl. No.: 15/402,424

(22) Filed: Feb. 17, 2017

(65) Prior Publication Data
US 2017/0237312 A1 Aug. 17, 2017

Related U.S. Application Data (60) Provisional application No. 62/279,854, filed on Jan. 18, 2016, provisional application No. 62/279,372, filed on Jan. 15, 2016.

(51) Int. Cl.
*H02K 5/10* (2006.01)
*H02K 5/15* (2006.01)
*H02K 5/24* (2006.01)
*H02K 7/00* (2006.01)
*H02K 7/116* (2006.01)
*H02K 11/33* (2016.01)
(Continued)

(52) U.S. Cl.
CPC ............... *H02K 5/24* (2013.01); *H02K 5/10* (2013.01); *H02K 5/15* (2013.01); *H02K 7/003* (2013.01); *H02K 7/116* (2013.01); *H02K 11/215* (2016.01); *H02K 11/30* (2016.01); *H02K 11/33* (2016.01); *H02K 29/08* (2013.01); *H02K 2211/03* (2013.01)

(58) Field of Classification Search
CPC .. H02K 5/10; H02K 5/15; H02K 5/24; H02K 7/003; H02K 7/116; H02K 29/08; H02K 2211/03
USPC ....................................... 310/68 B, 68 R, 89
See application file for complete search history.

(56) References Cited

U.S. PATENT DOCUMENTS 5,260,532 A * 11/1993 Tinder .................. H01H 9/04
200/292
8,339,004 B2 * 12/2012 Tang ..................... H02K 11/33
310/89

(Continued)

FOREIGN PATENT DOCUMENTS

JP    2009177869 A    8/2009
WO   2010027447 A2    3/2010
WO   2010138455 A2   12/2010

OTHER PUBLICATIONS

Hella Actuator with Metal Clips.

*Primary Examiner* — John K Kim
(74) *Attorney, Agent, or Firm* — Daniel Deneufbourg (57) ABSTRACT

An actuator comprising a housing defining an interior cavity for a motor, gear assemblies, and a printed circuit overlying the motor and the gear assemblies. An elastomeric seal band is located between the housing and the cover for sealing the interior cavity of the housing. The seal band includes a plurality of compressible elastomeric beads that abut against the cover and exert a force against the printed circuit board respectively for preventing the vibration of the printed circuit board in the housing. A plurality of curved clips are received in respective clip brackets formed on the housing and the cover respectively for clamping a cover to the housing.

9 Claims, 5 Drawing Sheets

(51) Int. Cl.
*H02K 11/215* (2016.01)
*H02K 11/30* (2016.01)
H02K 29/08 (2006.01)

(56) References Cited

U.S. PATENT DOCUMENTS

| | | | | |
|---|---|---|---|---|
| 8,680,727 | B2* | 3/2014 | Cors | H02K 5/1677 |
| | | | | 310/43 |
| 9,041,259 | B2* | 5/2015 | Palfenier | H02K 5/20 |
| | | | | 310/43 |
| 2010/0019629 | A1* | 1/2010 | Amaya | D06F 37/065 |
| | | | | 310/68 R |
| 2010/0301691 | A1* | 12/2010 | Cors | H02K 5/1677 |
| | | | | 310/83 |
| 2012/0018624 | A1* | 1/2012 | Baba | G02B 6/4201 |
| | | | | 250/214.1 |
| 2014/0021832 | A1* | 1/2014 | Palfenier | H02K 7/116 |
| | | | | 310/68 B |
| 2015/0260324 | A1* | 9/2015 | Raper | F16L 37/0925 |
| | | | | 285/370 |
| 2015/0316062 | A1* | 11/2015 | Rosinski | H02K 29/08 |
| | | | | 417/423.3 |
| 2016/0268867 | A1* | 9/2016 | Mackowiak | H02K 5/225 |
| 2017/0237312 | A1* | 8/2017 | Stewart | H02K 11/215 |
| | | | | 310/68 B |

\* cited by examiner

ACTUATOR WITH SEAL BAND

CROSS-REFERENCE TO RELATED APPLICATIONS

This application claims the benefit of the filing date and disclosure of U.S. Provisional Patent Application Ser. No. 62/279,372 filed on Jan. 15, 2016 and U.S. Provisional Patent Application Ser. No. 62/279,854 filed on Jan. 18, 2016, the contents of which are incorporated herein by reference as are all references cited therein.

FIELD OF THE INVENTION

This invention relates to an actuator and, more specifically, to a vehicle engine component actuator.

BACKGROUND OF THE INVENTION

Actuators are used in equipment such as vehicles to actuate vehicle components including for example the vanes of vehicle engine turbochargers.

The present invention is directed to such a vehicle component actuator with new improved and cost saving features including, among other elements, a compact motor and gear structure, a seal band with beads for sealing the actuator and retaining the printed circuit board against vibration in the housing, and improved clips for securing the actuator cover to the actuator housing.

SUMMARY OF THE INVENTION

The present invention is directed generally to an actuator comprising a housing defining an interior cavity for a motor, a plurality of gears, and a printed circuit board, a cover for the housing, a seal band between the housing and the cover for sealing the interior cavity of the housing, the seal band including a plurality of beads abutting against the cover and the printed circuit board respectively to prevent vibration of the printed circuit board in the housing of the actuator.

In one embodiment, the cover defines an elongate slot adapted to receive the seal band and one or ore grooves adapted to receive the plurality of beads respectively.

In one embodiment, each of the plurality of beads includes opposed generally cone-shaped compressible bead segments each terminating in a flat distal end face abutting against the cover and the printed circuit board respectively.

In one embodiment, a plurality of curved clips received in respective clip brackets formed on the housing and the cover respectively for securing the cover to the housing.

In one embodiment, each of the clips includes upper and lower clip lips and a curved dip span therebetween, each of the clip lips including a tab, each of the clip brackets defining an elongate bracket lip, an elongate bracket recess located inwardly of the elongate bracket lip, and a bracket pocket defined in the elongate bracket recess, the upper and lower clip lips being received in the respective elongate bracket recesses and the tab on each of the clip lips being received in the respective bracket pockets for clamping the respective clips to the respective brackets.

The present invention is also directed to a vehicle engine component actuator comprising a housing defining an interior cavity, a printed circuit board located in the housing and including a Hall effect sensor mounted thereon, a motor located in the interior cavity of the housing, the motor including a stationary motor stator, a rotatable motor rotor with a magnet, and a stationary motor shaft extending through the stator and the rotor and including a first end secured in a wall of the housing, the Hall effect sensor being adapted to sense a change in the magnetic field generated by the magnet in response to the rotation of the rotor, an intermediate gear assembly located in the housing in a side-by-side relationship with the motor, the intermediate gear assembly including a first rotatable shaft and a first gear mounted to and rotatable with the first rotatable shaft; the first gear meshing with the motor shaft, and an output gear assembly located in the housing in a side-by-side relationship with the intermediate gear assembly and the motor with the intermediate gear assembly located between the motor and the output gear assembly, the output gear assembly including a second rotatable shaft and a second gear mounted to and rotatable with the second rotatable shaft, the second gear meshing with the first rotatable shaft of the intermediate gear assembly.

In one embodiment, the motor shaft includes a second end extending through a first aperture in the printed circuit board, the first rotatable shaft of the intermediate gear assembly includes a first end extending through a second aperture in the printed circuit board and the first gear of the intermediate gear assembly is coupled to the first end of the first rotatable shaft and is located above and spaced from and generally parallel to the printed circuit board, and the second gear of the output gear assembly being located below and spaced from and generally parallel to the printed circuit board.

In one embodiment, a cover for the housing defines an elongate slot and an elastomeric seal band extends through the elongate slot defined in the cover of the housing for sealing the actuator.

In one embodiment, the elastomeric seal band includes a plurality of beads abutting against the cover and compressed against the printed circuit board to prevent vibration of the printed circuit board in the housing.

The present invention is further directed to a vehicle engine component actuator comprising a housing defining an interior cavity, a printed circuit board located in the housing and including a Hall effect sensor mounted thereon, a motor located in the interior cavity of the housing, the motor including a stationary motor stator, a rotatable motor rotor with a magnet, and a stationary motor shaft extending through the stator and the rotor and including a first end secured in a wall of the housing, the Hall effect sensor being adapted to sense a change in the magnetic field generator by the magnet in response to the rotation of the rotor, an intermediate gear assembly located in the housing in a side-by-side relationship with the motor, the intermediate gear assembly including a first rotatable shaft and a first gear mounted to and rotatable with the first rotatable shaft; the first gear meshing with the motor shaft, an output gear assembly located in the housing in a side-by-side relationship with the intermediate gear assembly and the motor with the intermediate gear assembly located between the motor and the output gear assembly, the output gear assembly including a second rotatable shaft and a second gear mounted to and rotatable with the second rotatable shaft, the second gear meshing with the first rotatable shaft of the intermediate gear assembly, a cover for the housing, an elastomeric seal between the housing and the cover for sealing the interior cavity of the housing, the seal including a plurality of beads abutting against the cover and the printed circuit board respectively to prevent vibration of the printed circuit board in the housing, and a plurality of curved clips received in respective clip brackets formed on the housing and the cover respectively for securing the cover to the housing, each of the clips including upper and lower clip lips and a curved clip span therebetween, each of the clip lips including a tab, each of the clip brackets defining an elongate bracket lip, an elongate bracket recess located inwardly of the elongate bracket lip, and a bracket pocket defined in the elongate bracket recess, the upper and lower clip lips being received in the respective elongate bracket recesses and the tab on each of the clip lips being received in the respective bracket pockets for clamping the respective clips to the respective brackets.

In one embodiment, each of the plurality of beads includes opposed compressible bead segments each terminating in a distal end face abutted against the cover and the printed circuit board respectively.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the description of the accompanying FIGS. as follows.

DETAILED DESCRIPTION OF THE EMBODIMENT

FIGS. 1, 2, 3, 4, and 5 depict an actuator 10 in accordance with the present invention which, in the embodiment shown, is an actuator adapted to actuate a vehicle component such as for example the vanes of a turbocharger in a motor vehicle engine.

The actuator 10 initially comprises a lower elongated housing 12 including a circumferentially extending generally vertical wall 13 and a lower generally horizontal base wall 11 together defining an interior hollow cavity 14 (FIGS. 4 and 5) adapted to receive and house an electric BLOC (brushless direct current) motor 20, a plurality of gears and shafts as described in more detail below, and a substrate in the form of a printed circuit board (PCB) 40.

The vertical wall 13 and horizontal base wall 11 further include and define a plurality of mounting brackets 15 formed and located at respective corners of the actuator 10 and each defining a through-aperture 16 adapted to receive respective mounting bolts (not shown) for mounting the actuator 10 to and in the engine compartment (not shown) of a vehicle (not shown). The housing 12, and more specifically the vertical wall 13 thereof, further includes and defines a top peripheral, horizontally, circumferentially, and outwardly extending lip or ledge 12a.

Figure 4:
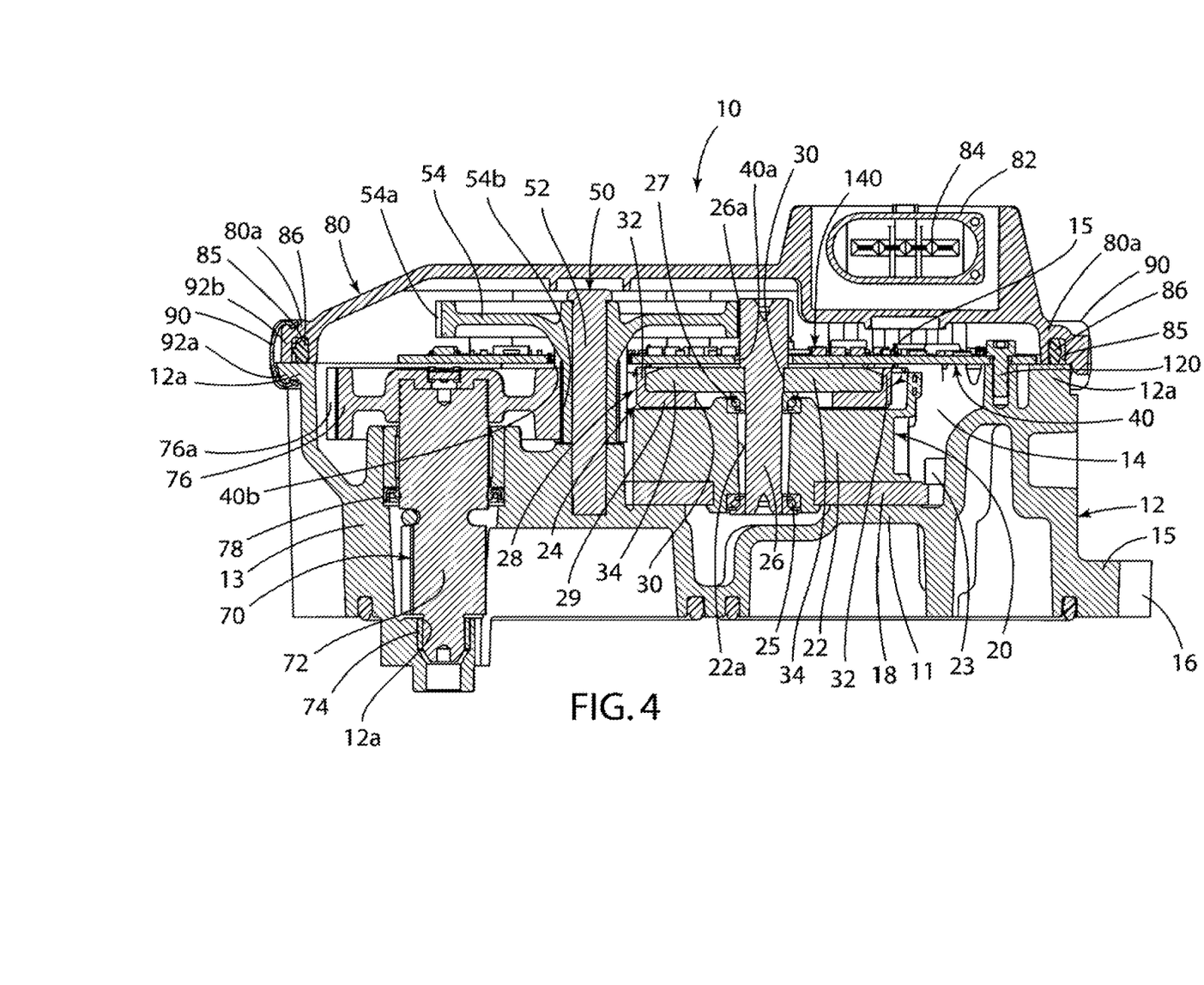
FIG. 4 is a longitudinal vertical cross-sectionalview of the actuator of FIG. 1.
Figure 5:
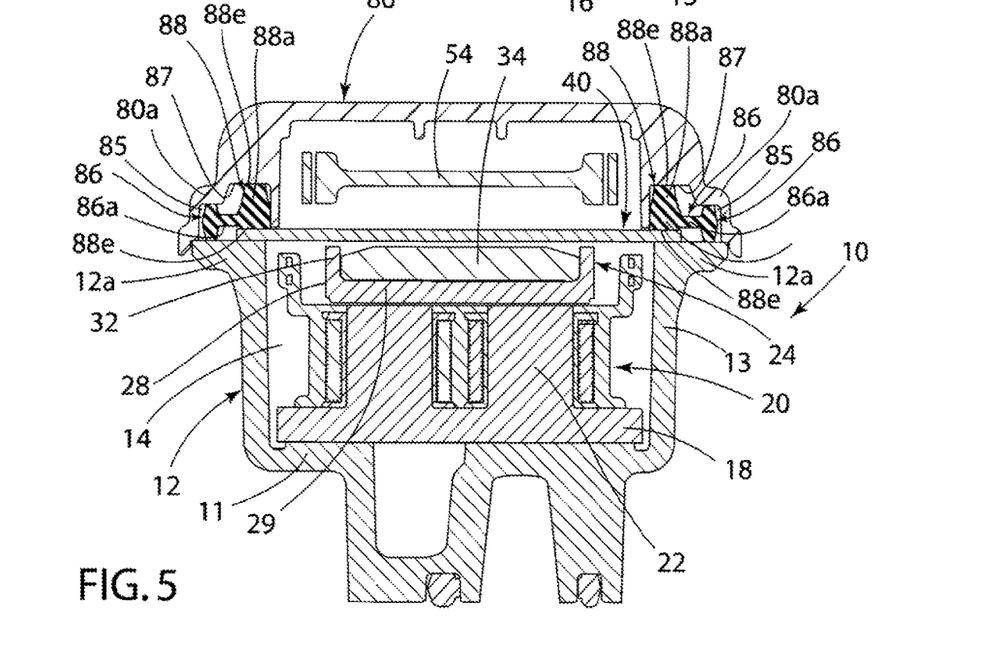
FIG. 5 is a transverse vertical cross-sectional view of the actuator of FIG. 1.

Referring to FIGS. 4 and 5, the motor 20 is seated and secured in the interior cavity 14 of the housing 12 and comprises a stationary stator 22 including a horizontal base 18 mounted on and secured to a portion of the housing base wall 11, a horizontally positioned disc-shaped rotor 24, and an elongate generally vertically positioned shaft 26.

The motor shaft 26 includes an upper end extending through an aperture 40a defined in the printed circuit board 40 and an elongate body extending through respective through central apertures 22a and 30 defined in the stator 22 and the rotor 24 respectively. The motor shaft 26 is rotatable relative to the stator 22 via a pair of ball bearings 25 and 27 located at opposed ends of the stator through-aperture 22a. The rotor 24 is positioned in a horizontal relationship overlying and spaced from and parallel to the top exterior face of the stator 22 and below and spaced from and parallel to the lower exterior surface of the printed circuit board 40.

Specifically, the rotor 24 is comprised of a generally horizontally positioned cup-shaped or cupped magnet 28 that is made from a suitable magnetic material and includes a generally flat and disc-shaped horizontal base 29 defining the central aperture or through-hole 30. The magnet 28 additionally includes a peripheral and circumferentially extending vertical wall or lip or rim 32 extending unitarily outwardly and upwardly from the periphery of the base 29 to define a generally cup-shaped or cupped magnet 28 defining an interior cavity or receptacle. In the embodiment shown, the magnet 28 is a multi-pole magnet.

The rotor 24 further includes a generally disc-shaped metal pole piece 34 seated in the magnet 28 and, more specifically, a metal pole piece 34 seated in the interior cavity or receptacle of the cupped magnet 28 in a horizontal relationship with the bottom exterior surface of the pole piece 34 seated and abutted against the top exterior surface of the base 29 of the magnet 28 and the side exterior peripheral surface of the pole piece 34 abutted against the interior face of the circumferential peripheral wall or lip 32 of the magnet 28.

Figure 1:
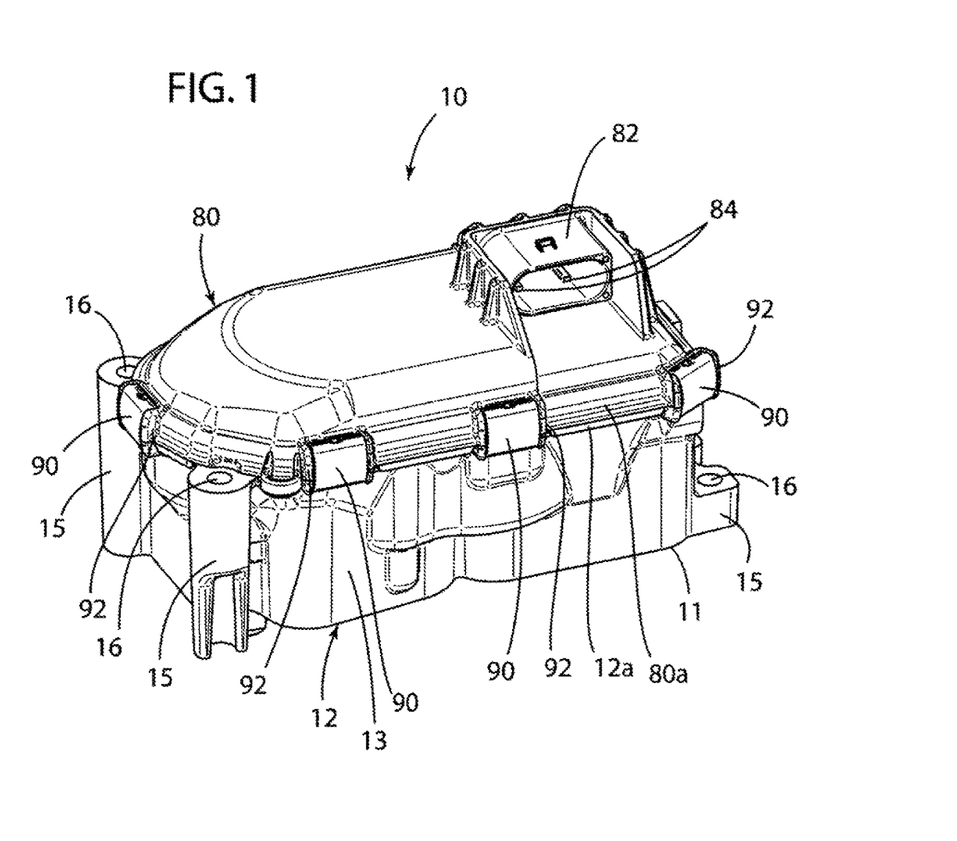
FIG. 1 is a perspective view of an actuator in accordance with the present invention.
Figure 2:
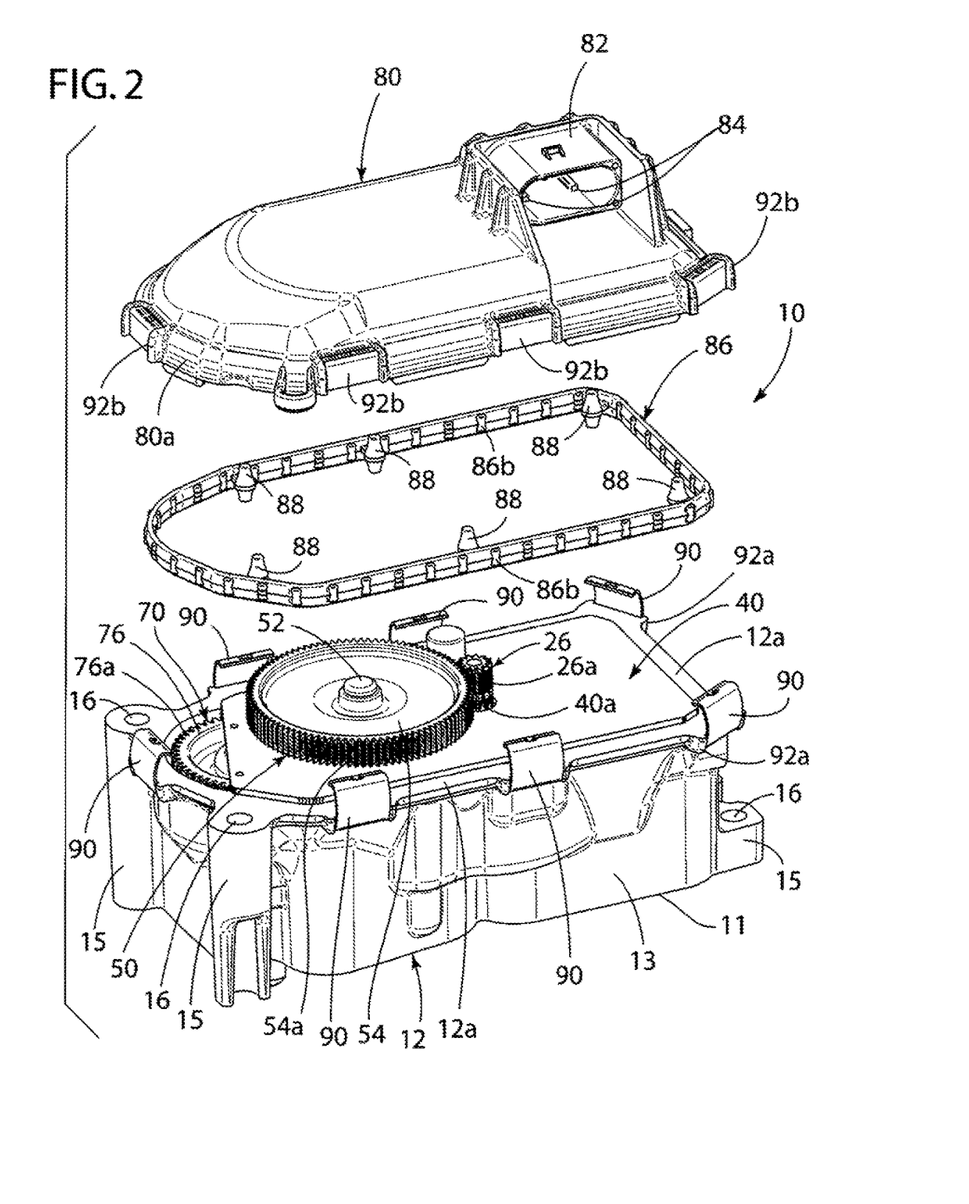
FIG. 2 is an exploded perspective view of the actuator of FIG. 1.
Figure 3:
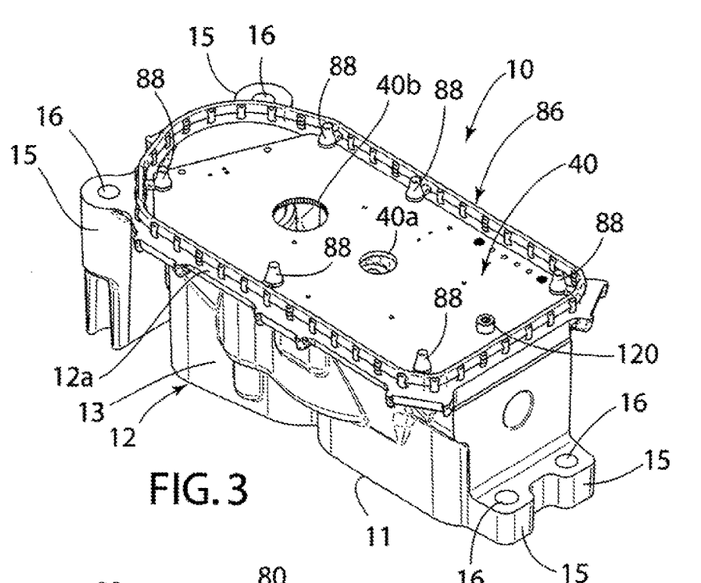
FIG. 3 is a perspective view of the actuator of FIG. 1 without its cover and without any of the electrical components or gears mounted on the surface of the printed circuit board.

Referring to FIGS. 2, 3, 4, and 5, the printed circuit board 40 is located and secured in the interior cavity 14 of the housing 12 in a horizontal relationship overlying and spaced from and parallel to the top exterior surface of the rotor 24. More specifically as shown in FIGS. 3 and 4, a single screw 120 extends through the printed circuit board 40 and into a portion of the base wall 11 of the housing 12 for securing the printed circuit board 40 in the interior cavity 14 of the housing 12.

The printed circuit board 40 further includes and defines the shaft receiving aperture 40a and a second shaft receiving through-aperture 408 positioned in a spaced and co-linear relationship relative to the aperture 40a.

The printed circuit board 40 includes a plurality of electrical/electronic components 140 (FIG. 4) mounted to the exterior top face or surface thereof including for example a magnetic flux field sensor in the form of Hall Effect switches/latches.

Electrical terminals 15 (FIG. 4) extend from the motor 10 into and through the printed circuit board 40 and into electrical coupling relationship with selected ones of the electronic components 140.

In the embodiment shown, the rotor 24, and more specifically the cupped magnet 28, is positioned in the interior cavity 14 of the housing 12 of the actuator 10 in a relationship with the wall or lip 32 of the magnet 28 positioned vertically co-linearly with and spaced from the Hall Effect switches/latches mounted on the top exterior surface of the printed circuit board 40 and, still more specifically, in a relationship with the vertical wall or lip 32 of the magnet 28 positioned in a relationship generally normal with and spaced from the bottom exterior surface of the printed circuit board 40.

As shown in FIGS. 2 and 4, the actuator 10 further comprises an intermediate gear assembly 50 located in the interior cavity 14 of the housing 12. The intermediate gear assembly 50 includes a vertically oriented elongate stationary gear shaft 52 extending in a relationship generally normal to the printed circuit board 40 and the base wall 11 of the housing 12, an upper end extending through the aperture 40b defined in the printed circuit board 40, and a lower end extending into and secured in a portion of the base wall 11 of the housing 12.

A generally horizontally positioned disc-shaped rotatable gear 54 (FIGS. 2, 4, and 5) surrounds, and is rotatable relative to, an upper end of the gear shaft 52 and is positioned in a relationship normal to the gear shaft 52 and parallel to and spaced and opposed from and overlying the upper exterior face of the printed circuit board 40.

In the embodiment shown, the gear shaft 52 of the intermediate gear assembly 50 and the motor shaft 26 are positioned in a spaced-apart and parallel relationship relative to each other with a toothed side exterior circumferential surface 54a of the gear 54 in meshing relationship with a toothed side exterior circumferential surface 26a defined at the upper end of the motor shaft 26.

Still referring to FIGS. 2 and 4, the actuator 10 further comprises an output gear assembly 70 also located in the interior cavity 14 of the housing 12. The output gear assembly 70 includes a vertical rotatable output gear shaft 72 positioned in a relationship generally normal to the base 11 of the housing 12 and generally normal to and below and spaced from the printed circuit board 40 and further in a relationship generally parallel to and spaced from the intermediate gear shaft 52 and including a lower end extending through a through-hole 12a defined in a portion of the base wall 11 of the housing 12.

A roller bearing 74 surrounds the lower end of the output gear shaft 72 that extends out of the base wall 11 of the housing 12. A generally horizontally positioned disc-shaped rotatable gear 76 surrounds an upper end of the gear shaft 72 and is positioned in a relationship normal to the gear shaft 72 and parallel to and spaced and opposed from and below the lower exterior surface of the printed circuit board 40.

The output gear 76 includes a toothed side exterior circumferential surface 76a in meshing relationship with a second toothed side exterior surface 54b defined on the intermediate gear shaft 72. A ball bearing 78 surrounds the output gear shaft 72 and together with the roller bearing 74 mounts the output gear shaft 72 and the output gear 76 in the housing 12 for rotation relative to the housing 12.

Thus, in the embodiment shown, the motor 20, the intermediate gear assembly 50, and the output gear assembly 70 are positioned relative to each other in the interior cavity 14 of the housing 12 in a side-by-side longitudinally extending relationship with the intermediate gear assembly 50 located between the motor 20 and the output gear assembly 70, the motor shaft 26 in meshing relationship with the intermediate gear 54, and the intermediate gear 54 in meshing relationship with the output gear 76.

In accordance with the operation of the actuator 10 and referring to FIG. 4, actuation of the motor 20 results in rotation of the motor shaft 26 which results in the rotation of the intermediate gear 54 which results in the rotation of the output gear 76 which results in the rotation of the output gear shaft 72 which results in the activation or movement of the vehicle engine component (not shown but including for example the vanes of a vehicle engine turbocharger) that is operably associated with and connected to the lower end of the output gear shaft 72.

The rotation of the rotor 24 of the motor 20 results in the rotation of the motor magnet 28 which results in a change in the magnitude and direction of the magnetic field generated by the motor magnet 28 which is sensed by the Hall Effect sensors mounted on the printed circuit board 40 to allow the position of the rotor 24, and thus the position of the vehicle engine component (not shown) operably connected thereto via the motor shaft 26 and gear assemblies 50 and 70, to be determined.

Referring to FIGS. 1, 2, 4, 5, 7, and 8, the actuator 10 further comprises a plastic cover 80 that covers the housing 12 and, more specifically, a plastic cover 80 that covers the motor 20 and the gear assemblies 50 and 70 located in the interior cavity 14 of the housing 12.

The cover 80 includes and defines a unitary terminal housing or receptacle 82 on the top surface thereof for electrical terminals 84 that extend from the terminal housing 82 through the cover 80 and into electrical coupling relationship with selected ones of the electrical components 140 located on the printed circuit board 40, The electrical terminals 84 are also adapted for connection to an electrical cable (not shown) adapted for coupling to the terminal receptacle 82 and further adapted for coupling to a vehicle engine controller (not shown).

Figures 6, 7, 8:
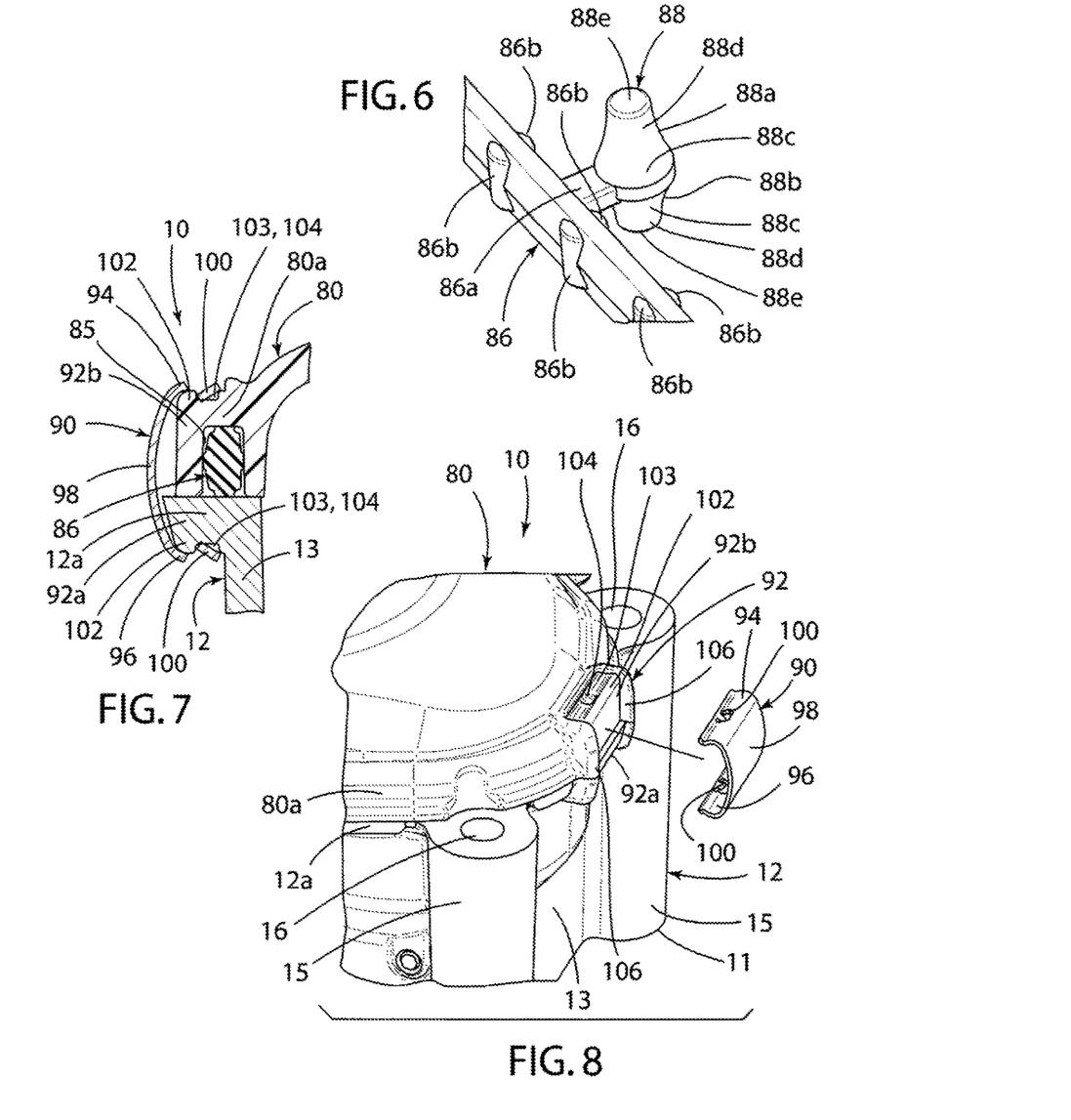
FIG. 6 is an enlarged, broken perspective view of a portion of the elastomeric seal band of the actuator of the present invention.
FIG. 7 is an enlarged, broken, transverse vertical cross-sectional view of the seal band wedged between the housing and the cover of the actuator of the present invention.
FIG. 8 is an enlarged, broken, exploded, perspective view of the actuator of FIG. 1 and, more specifically, of the clip structure of the actuator of FIG. 1

Referring to FIGS. 4, 5, and 7 in particular, the cover 80 also includes a peripheral and circumferentially extending lip or ledge 80a defining a peripheral circumferentially extending seal receiving groove or recess or slot 85 and one or more peripheral seal bumper receiving grooves or recesses 87 (FIG. 5). In the embodiment shown, the groove 85 and 87 are defined in and protrude into the exterior lower surface of the lip or ledge 80a and are positioned relative to each other in a side-by-side, spaced-apart, and generally parallel relationship.

The actuator 10 still further comprises an elastomeric peripheral and circumferentially extending seal band 86 for the cover 80 that is in the form of an elongate and circumferentially extending unitary strip or band of elastomeric material received in the circumferential elongate groove or slot or recess 85 defined in the lip 80a of the cover 80 and which additionally includes a plurality of elastomeric compressible beads or studs 88 unitary with the band of elastomeric material defining the seal band 86 and adapted to be received in the respective one or more bumper receiving grooves or recesses 87 also defined in the lip 80a of the cover 80.

In the embodiment of the seal band 86 shown in the FIGURES, and more specifically in the embodiment of the seal band 86 shown in FIGS. 3 and 6, the seal band 86 includes six spaced apart beads 88 formed and located thereon in a spaced apart relationship relative to each other with two opposed and co-linear beads 88 located at one end of the circumferential strip of elastomeric material defining the seal band 86, two other opposed and co-linear beads 88 generally centrally located on the band of elastomeric material defining the seal band 86, and two opposed and co-linear beads 88 located at the other end of the band of elastomeric material defining the seal band 86 and positioned in a relationship diametrically opposed to the beads 88 located at the other end of the seal 86.

As more specifically shown in FIG. 6, each of the beads 88 includes an upper generally cone-shaped compressible bead segment 88a and a diametrically opposed lower generally cone-shaped compressible bead segment 88b. In the embodiment shown, the bead segments 88a and 88b include respective base segments 88c which are unitary with and molded to each other, respective bead tip segments 88d converging outwardly away from the respective base segments 88c, and respective flat faces 88e defined at the terminal or distal end of the respective bead tip segments 88d.

In the embodiment shown, the bead segments 88a and 88b are generally vertically co-linearly aligned with each other and extend in opposite directions in a relationship with the respective terminal distal flat end faces 88e oriented in a spaced-apart, diametrically opposed, and generally parallel relationship to each other.

As still more specifically shown in FIG. 6, a plurality of elongate strips or segments of elastomeric material 86a unitary with both the circumferential strip of elastomeric material defining the seal band 86 and the beads 88 couples and connects the respective beads 88 to the band of elastomeric material defining the seal band 86.

As still more specifically shown in FIG. 6, a plurality of bumpers or bumps 86b protrude unitarily outwardly from the exterior surface of the elongate circumferentially extending strip of elastomeric material that comprises and defines the seal band 86. In the embodiment shown, the bumps 86b are arranged in pairs of diametrically opposed bumps 86b located on opposite exterior side faces of the elongate circumferential strip of elastomeric material comprising the seal band 86. The pairs of bumps 86b extend along the length of the circumferential strip or band of elastomeric material comprising the seal band 86 in a spaced-apart and generally parallel relationship.

As shown in FIGS. 2 and 3, the seal band 86 is formed to follow the generally oval shape and contour of the lips 12a and 80a of the housing 12 and the cover 80 respectively. As more particularly shown in FIGS. 4 and 5, the seal band 86 is located in the interior grooves or recesses or slots 85 and 87 defined in the peripheral lip 80a of the cover 80 in a relationship with the seal band 86 located in the groove 85 of the lip 80a with the respective diametrically opposed bumpers 86b abutted against the opposed exterior surfaces of the groove 85 of the lip 80a and the respective beads 88 located in the respective one or more grooves or recesses or slots 87 of the lip 80a with the distal end face 88e of the upper bead segment 88a of each of the beads 88 abutted against the exterior top surface of the interior of the one or more grooves or recesses or slots 87 of the lip 80a of the cover 80.

In turn, the cover 80 is secured to the housing 12 in a relationship with the lips 12a and 80a of the housing 12 and the cover 80 respectively abutted against each other and more specifically in a relationship with the lower exterior surface of the circumferential strip of elastomeric material comprising the seal band 86 abutted against the exterior upper surface of the lip 12a of the housing 12, the lower bead segment 88b of each of the beads 88 compressed against the top exterior face or surface of the printed circuit board 40, and the distal end face 88e of the lower bead segment 88b of each of the beads 88 abutted against the exterior top face or surface of the printed circuit board 40.

In accordance with the present invention, the lips 12a and 80a on the housing 12 and the cover 80 respectively in combination with the seal band 86 advantageously provide a seal against the ingress of exterior engine compartment contaminants into the interior cavity 14 of the actuator 10 during use of the actuator 10.

Still further in accordance with the present invention, the beads 88 advantageously prevent the printed circuit board 40 from moving or vibrating in the Z direction, while still allowing for thermal expansion of the printed circuit board 40 in the X and Y directions.

Moreover, and as shown more particularly in FIGS. 4 and 5, the respective elastomeric beads 88 and more specifically the respective lower bead segments 88b thereof are adapted to be crushed or compressed against the surface of the printed circuit board 40 and further are adapted by virtue of their compressed condition to exert a downward clamping force against the printed circuit board 40 upon placement of the cover 80 on the housing 12 for clamping and securing the printed circuit board 40 against movement in the housing 12 as discussed above.

Referring to FIGS. 1, 2, 4, 7, and 8, the actuator 10 still further comprises an assembly for securing the cover 80 to the housing 12 including a plurality of metal clips 90 adapted for clamping to a plurality of respective clip brackets 92 comprised of respective bracket segments 92a and 92b formed unitarily on the respective peripheral lips 12a and 80a of the housing 12 and the cover 80 respectively.

Referring to FIGS. 7 and 8 in particular, each of the clips 90 is comprised of a strip or piece of metal which has been bent and formed to include a curved or concave central span 98 and opposed upper and lower elongate and curvilinear lips 94 and 96 which in combination make the clips 90 more flexible and increase the residual clamp load of the clips 90 after installation.

A retention spring tab or finger 100 is formed on and protrudes inwardly from the exterior inner surface of each of the respective lips 94 and 96. The lips 94 and 96 and the respective retention spring tabs or fingers 100 formed thereon are disposed in a diametrically opposed relationship with the respective spring tabs or fingers 100 being disposed in a co-linear relationship. In the embodiment shown, the curves of the central span 98 and the lips 94 and 96 extend and are oriented in directions normal to each other.

Each of the clip brackets 92a and 92b formed on the lips 12a and 80a of the housing 12 and the cover 80 respectively include respective elongate curved upper and lower horizontally extending lips or bumps 102 that prevent large yielding of the clip 90 during assembly and relaxation of the clip 90 after the clip 90 passes beyond the respective lips 102 during assembly; respective elongate curved upper and lower horizontally extending bracket depressions or grooves or recesses 103 located inwardly of and adjacent and parallel to the respective lips 102 and complementary in shape to the curve of the respective lips 94 and 96 of the respective clip brackets 92a and 92b; and respective bracket pockets or recesses 104 formed in the respective bracket depressions 103 that allow for strong engagement of the respective clip tabs 100 with the housing 12 and the cover 80 during assembly.

Each of the clip brackets 92a and 92b also includes spaced-apart and parallel vertical side walls 106 respectively for aligning and guiding the respective clips 90 into the respective brackets 92a and 92b during assembly. In the embodiment shown, the vertical side walls 106 extend in a relationship and orientation normal to the lips 102 and the grooves 103 of the respective clip brackets 92.

The embodiment shown includes seven clips 90 secured to seven clip brackets 92 in a relationship with the respective lips 94 and 96 of the respective clips 90 located and clamped within the respective recesses 103 of the respective brackets 92 and with the respective tabs 100 of the respective lips 94 and 96 located and wedged within the respective pockets 104 of the respective brackets 92 for securely and tightly removably clamping and clipping the clips 90 to the housing 12 and the cover 80 and more specifically for removably securing the cover 80 to the housing 12 of the actuator 10.

Numerous variations and modifications of the actuator embodiment described above may be effected without departing from the spirit and scope of the novel features of the invention. It is to be understood that no limitations with respect to the specific actuator illustrated herein are intended or should be inferred. It is, of course, intended to cover by the appended claims all such modifications as fall within the scope of the claims.

What is claimed is:

1. An actuator comprising:
   a housing defining an interior cavity for a motor, a plurality of gears, and a printed circuit board;
   a cover for the housing;
   a seal band between the housing and the cover for sealing the interior cavity of the housing, the seal band including a plurality of beads abutting against the cover and the printed circuit board respectively to prevent vibration of the printed circuit board in the housing of the actuator.

2. The actuator of claim 1 wherein the cover defines an elongate slot adapted to receive the seal band and one or more grooves adapted to receive the plurality of beads respectively.

3. The actuator of claim 1 wherein each of the plurality of beads includes opposed generally cone-shaped compressible bead segments each terminating in a flat distal end face abutting against the cover and the printed circuit board respectively.

4. The actuator of claim 1 further comprising a plurality of curved clips received in respective clip brackets formed on the housing and the cover respectively for securing the cover to the housing.

5. The actuator of claim 1 wherein each of the clips includes upper and lower clip lips and a curved clip span therebetween, each of the clip lips including a tab, each of the clip brackets defining an elongate bracket lip, an elongate bracket recess located inwardly of the elongate bracket lip, and a bracket pocket defined in the elongate bracket recess, the upper and lower clip lips being received in the respective elongate bracket recesses and the tab on each of the clip lips being received in the respective bracket pockets for clamping the respective clips to the respective brackets.

6. A vehicle engine component actuator comprising:
   an interior cavity;
   a printed circuit board located in the interior cavity and including a Hall effect sensor mounted thereon;
   a motor located in the interior cavity, the motor including a stationary motor stator, a rotatable motor rotor with a magnet, and a stationary motor shaft extending through the stator and the rotor and including a first end secured in a wall of the housing, the Hall effect sensor being adapted to sense a change in the magnetic field generated by the magnet in response to the rotation of the rotor;
   an intermediate gear assembly located in the interior cavity in a side-by-side relationship with the motor, the intermediate gear assembly including a first rotatable shaft and a first gear mounted to and rotatable with the first rotatable shaft; the first gear meshing with the motor shaft; and
   an output gear assembly located in the interior cavity in a side-by-side relationship with the intermediate gear assembly and the motor with the intermediate gear assembly located between the motor and the output gear assembly, the output gear assembly including a second rotatable shaft and a second gear mounted to and rotatable with the second rotatable shaft, the second gear meshing with the first rotatable shaft of the intermediate gear assembly;
   the motor shaft including a second end extending through a first aperture in the printed circuit board;
   the first rotatable shaft of the intermediate gear assembly including a first end extending through a second aperture in the printed circuit board and the first gear of the intermediate gear assembly is coupled to the first end of the first rotatable shaft and is located above and spaced from and generally parallel to the printed circuit board; and
   the second gear of the output gear assembly being located below and spaced from and generally parallel to the printed circuit board.

7. A vehicle engine component actuator comprising:
   an interior cavity;
   a printed circuit board located in the interior cavity and including a Hall effect sensor mounted thereon;
   a motor located in the interior cavity, the motor including a stationary motor stator, a rotatable motor rotor with a magnet, and a stationary motor shaft extending through the stator and the rotor and including a first end secured in a wall of the housing, the Hall effect sensor being adapted to sense a change in the magnetic field generated by the magnet in response to the rotation of the rotor;
   an intermediate gear assembly located in the interior cavity in a side-by-side relationship with the motor, the intermediate gear assembly including a first rotatable shaft and a first gear mounted to and rotatable with the first rotatable shaft; the first gear meshing with the motor shaft; and
   an output gear assembly located in the interior cavity in a side-by-side relationship with the intermediate gear assembly and the motor with the intermediate gear assembly located between the motor and the output gear assembly, the output gear assembly including a second rotatable shaft and a second gear mounted to and rotatable with the second rotatable shaft, the second gear meshing with the first rotatable shaft of the intermediate gear assembly;
   a cover for the housing, the cover defining an elongate slot; and
   an elastomeric seal band extending through the elongate slot defined in the cover of the housing for sealing the actuator, the elastomeric seal band including a plurality of beads abutting against the cover and compressed against the printed circuit board to prevent vibration of the printed circuit board in the housing.

8. A vehicle engine component actuator comprising:
   a housing and a cover together defining an interior cavity;
   a printed circuit board located in the housing and including a Hall effect sensor mounted thereon;
   a motor located in the interior cavity, the motor including a stationary motor stator, a rotatable motor rotor with a magnet, and a stationary motor shaft extending through the stator and the rotor and including a first end secured in a wall of the housing, the Hall effect sensor being adapted to sense a change in the magnetic field generator by the magnet in response to the rotation of the rotor;

an intermediate gear assembly located in the interior cavity in a side-by-side relationship with the motor, the intermediate gear assembly including a first rotatable shaft and a first gear mounted to and rotatable with the first rotatable shaft; the first gear meshing with the motor shaft;

an output gear assembly located in the interior cavity in a side-by-side relationship with the intermediate gear assembly and the motor with the intermediate gear assembly located between the motor and the output gear assembly, the output gear assembly including a second rotatable shaft and a second gear mounted to and rotatable with the second rotatable shaft, the second gear meshing with the first rotatable shaft of the intermediate gear assembly;

an elastomeric seal between the housing and the cover for sealing the interior cavity, the seal including a plurality of beads abutting against the cover and the printed circuit board respectively to prevent vibration of the printed circuit board; and a plurality of curved clips received in respective clip brackets formed on the housing and the cover respectively for securing the cover to the housing, each of the clips including upper and lower clip lips and a curved clip span therebetween, each of the clip lips including a tab, each of the clip brackets defining an elongate bracket lip, an elongate bracket recess located inwardly of the elongate bracket lip, and a bracket pocket defined in the elongate bracket recess, the upper and lower clip lips being received in the respective elongate bracket recesses and the tab on each of the clip lips being received in the respective bracket pockets for clamping the respective clips to the respective brackets.

9. The vehicle engine component actuator of claim 8 wherein each of the plurality of beads includes opposed compressible bead segments each terminating in a distal end face abutted against the cover and the printed circuit board respectively.

* * * * *